US012695106B2

(12) United States Patent
Fernandez Garcia et al.

(10) Patent No.: US 12,695,106 B2
(45) Date of Patent: Jul. 28, 2026

(54) FUEL CELL SYSTEM AND METHOD FOR GENERATING INERT GAS FOR A FUEL CELL SYSTEM

(71) Applicants: Airbus Operations GmbH, Hamburg (DE); Airbus Operations SAS, Toulouse (FR)

(72) Inventors: Janik Fernandez Garcia, Toulouse (FR); Nikolaus Soukup, Hamburg (DE)

(73) Assignees: Airbus Operations GmbH, Hamburg (DE); Airbus Operations SAS, Toulouse (FR)

( * ) Notice: Subject to any disclaimer, the term of this patent is extended or adjusted under 35 U.S.C. 154(b) by 600 days.

(21) Appl. No.: 18/317,220

(22) Filed: May 15, 2023

(65) Prior Publication Data

US 2023/0378504 A1 Nov. 23, 2023

(30) Foreign Application Priority Data

May 17, 2022 (EP) ..................................... 22315104

(51) Int. Cl.
| | |
|---|---|
| *H01M 8/04* | (2016.01) |
| *H01M 8/04089* | (2016.01) |

(Continued)

(52) U.S. Cl.
CPC ..... *H01M 8/0662* (2013.01); *H01M 8/04097* (2013.01); *H01M 8/04231* (2013.01);

(Continued)

(58) Field of Classification Search
CPC ......... H01M 8/04455; H01M 8/04465; H01M 8/04447; H01M 8/04231; H01M 8/04097
See application file for complete search history.

(56) References Cited

U.S. PATENT DOCUMENTS

| | | | |
|---|---|---|---|
| 5,248,567 A | 9/1993 | Amemiya et al. | |
| 5,856,034 A | 1/1999 | Huppmann et al. | |
| 2022/0302471 A1* | 9/2022 | Law ................... | H01M 8/0232 |

FOREIGN PATENT DOCUMENTS

| | | | |
|---|---|---|---|
| EP | 0550892 A1 | 7/1993 | |
| EP | 1845578 A2 * | 10/2007 | .......... H01M 8/0612 |

(Continued)

OTHER PUBLICATIONS

European Search Report for corresponding European Patent Application No. 22315104 dated Nov. 10, 2022; priority document.

*Primary Examiner* — Olatunji A Godo
(74) *Attorney, Agent, or Firm* — Greer, Burns & Crain, Ltd.

(57) ABSTRACT

A fuel cell system comprises a fuel cell unit in a housing and comprising an anode part and a cathode part, a hydrogen source for supplying hydrogen to the fuel cell unit, an air supply unit for supplying air to the fuel cell unit, and a catalytic converter for catalytically converting oxygen and hydrogen to generate an inert gas mixture and supplying it to the interior of the housing. The catalytic converter comprises a cathode exhaust gas intake for receiving a cathode exhaust gas from the cathode part of the fuel cell unit. In a method for generating inert gas for a fuel cell system, a purge gas is supplied from the anode part of the fuel cell unit, and/or fresh hydrogen is supplied from a hydrogen supply unit of the fuel cell unit to the catalytic converter, to generate the inert gas mixture.

15 Claims, 4 Drawing Sheets

(51) Int. Cl.

| | | |
|---|---|---|
| *H01M 8/04223* | (2016.01) | |
| *H01M 8/0444* | (2016.01) | |
| *H01M 8/0662* | (2016.01) | |
| *H01M 8/10* | (2016.01) | |

(52) U.S. Cl.
    CPC ... *H01M 8/04447* (2013.01); *H01M 8/04455*
        (2013.01); *H01M 2008/1095* (2013.01)

(56)                    References Cited

FOREIGN PATENT DOCUMENTS

| | | | |
|---|---|---|---|
| EP | 2963726 | A1 | 1/2016 |
| JP | H05217593 | A | 8/1993 |
| JP | H1167251 | A | 3/1999 |

* cited by examiner

FUEL CELL SYSTEM AND METHOD FOR GENERATING INERT GAS FOR A FUEL CELL SYSTEM

CROSS-REFERENCES TO RELATED APPLICATIONS

This application claims the benefit of European Patent Application Number 22315104.4 filed on May 17, 2022, the entire disclosure of which is incorporated herein by way of reference.

FIELD OF THE INVENTION

The invention relates to a fuel cell system and to a method for generating inert gas for a fuel cell system.

BACKGROUND OF THE INVENTION

PEM (polymer electrolyte membrane) fuel cell stacks are known to have small hydrogen leaks and also air leaks. To avoid accumulation of hydrogen, the surroundings of fuel cells are usually ventilated. The challenge is to dilute the leak hydrogen down to a safe concentration to avoid risk of ignition or detonation.

The normal ventilation covers leaks through permeation which cannot be avoided. In failure cases, bigger leaks can occur that can lead to hydrogen concentrations above the combustion or detonation limit. To dilute the leaking hydrogen from big leaks, a very high ventilation mass flow is required. This ventilation mass flow is in the range of the mass flow that is needed on the cathode side of the fuel cell to operate the fuel cell.

To provide standard ventilation for big leaks, approximately the same amount of air would have to be provided for ventilation than for the operation of the fuel cell. Any additional air mass flow that has to be provided means a penalty in efficiency of the fuel cell system and has to be avoided.

As an alternative to ventilation of the compartment in which the hydrogen or $H_2$ is released, inertization of the compartment can be performed. An inertization refers to ambient conditions that do not allow the formation of a gas mixture that can ignite or explode. There are different levels of inertization. An oxygen depleted environment that is low in oxygen content and prevents oxidation to happen even for big hydrogen gas leaks. Inert gas generators are widely available for aerospace applications for tank inertization; however, these systems are complex and require significant space.

SUMMARY OF THE INVENTION

It is an object of the invention to provide a fuel cell system and a method for generating inert gas for a fuel cell system which avoids a risk of ignition or explosion.

According to a first aspect, the invention provides a fuel cell system, comprising: a fuel cell unit provided in a housing and comprising an anode part and a cathode part, a hydrogen source for supplying hydrogen to the fuel cell unit, an air supply unit for supplying air to the fuel cell unit, a catalytic converter for catalytically converting oxygen and hydrogen to generate an inert gas mixture and supplying it to the interior of the housing, wherein the catalytic converter comprises a cathode exhaust gas intake for receiving a cathode exhaust gas from the cathode part of the fuel cell unit, and wherein the catalytic converter is configured for using (A) a purge gas supplied from the anode part of the fuel cell unit, and/or (B) fresh hydrogen supplied from a hydrogen supply unit of the fuel cell unit, or a mixture of the purge gas and the fresh hydrogen, to generate the inert gas mixture.

Preferably, the catalytic converter is configured for using gas resulting from leaks of the fuel cell system and provided in the interior of the housing to generate the inert gas mixture.

Preferably, the catalytic converter comprises a gas intake for receiving ambient gas from the interior of the housing to convert it to an oxygen depleted gas containing no or a strongly reduced hydrogen concentration.

Preferably, the fuel cell system comprises a heat exchanger configured for heating the hydrogen before it is supplied to the catalytic converter, and for cooling the inert gas mixture generated in the catalytic converter before it is supplied to the interior of the housing.

Preferably, the fuel cell system comprises a cooling unit for providing a separate coolant stream to cool the inert gas mixture generated in the catalytic converter before it is supplied to the interior of the housing.

Preferably, the fuel cell system comprises a cathode exhaust gas control valve for controlling the flow of the cathode exhaust gas supplied to the catalytic converter.

Preferably, the fuel cell system comprises a purge valve which is electronically and/or mechanically connected to the cathode exhaust gas control valve to control the flow of the cathode exhaust gas to the catalytic converter depending on the flow of the purge gas.

Preferably, the catalytic converter is part of a closed system for recycling the gas contained in the housing, the closed system preferably comprising hydrogen and oxygen sensors to determine the concentration of hydrogen and oxygen supplied to the catalytic converter, and preferably a fan for recirculating the gas received from the interior of the housing back to the interior of the housing after the catalytic conversion.

According to a second aspect, the invention provides a method for generating inert gas for a fuel cell system, comprising the steps:

supplying a cathode exhaust gas from a fuel cell unit provided inside a housing to a catalytic converter; supplying a purge gas from the anode part of the fuel cell unit and/or hydrogen from a hydrogen supply unit of the fuel cell system, or a mixture of both, to the catalytic converter; catalytically converting oxygen in the cathode exhaust gas and the supplied hydrogen and/or purge gas to generate an inert gas mixture; and supplying the generated inert gas mixture to the interior of the housing of the fuel cell unit.

Preferably, a gas resulting from leaks of the fuel cell system and provided in the interior of the housing is used to generate the inert gas mixture.

Preferably, the method comprises supplying gas from the interior of the housing to the catalytic converter.

Preferably, the method comprises heating the hydrogen before it is supplied to the catalytic converter, and cooling the inert gas mixture generated in the catalytic converter before it is supplied to the interior of the housing.

Preferably, the method comprises providing a separate coolant stream to cool the inert gas mixture generated in the catalytic converter before it is supplied to the interior of the housing.

Preferably, supplying the cathode exhaust gas to the catalytic converter is controlled depending on the supply of the purge exhaust gas to the catalytic converter.

Preferably, the gas in the housing of the fuel cell unit is recycled within in a closed system separated from the fuel cell unit, wherein gas from the interior of the housing is recirculated back to the interior of the housing after its catalytic conversion.

Preferably, the concentration of hydrogen and oxygen in the gas is determined before the catalytic conversion.

The invention provides a fuel cell system and a method for generating inert gas for a fuel cell system which avoids a risk of ignition or explosion. Moreover, the generation of inert gas according to the invention is based on mostly available components and process gas flows, and avoids additional equipment as much as possible to save space and weight.

In particular, the invention uses the availability of oxygen depleted air (e.g. 4% $O_2$) and the availability of hydrogen gas to decrease the concentration of oxygen down to a value that inhibits ignition of hydrogen resulting from leakage.

Particularly, the invention comprises a PEM fuel cell system in a housing and an inert gas generation unit. The inert gas generation unit consists of a catalytic converter that catalytically converts oxygen and hydrogen to an inert gas mixture.

In particular, different functional principles are possible, comprising (1) Inert gas generation from anode purge, (2) inert gas generation using fresh hydrogen, and (3) inert gas generation using gas in fuel cell housing from leaks. These functional principles can be combined with each other.

BRIEF DESCRIPTION OF THE DRAWINGS

In the following, exemplary embodiments of the invention showing further advantages and characteristics are described in detail with reference to the figures, in which.

In the figures, similar or identical elements and features are designated by the same reference numbers. The features, functions and advantages discussed herein and shown in the embodiments can be achieved independently and combined in other embodiments. The method steps can be performed in a different order.

DETAILED DESCRIPTION OF THE PREFERRED EMBODIMENTS

Figure 1:
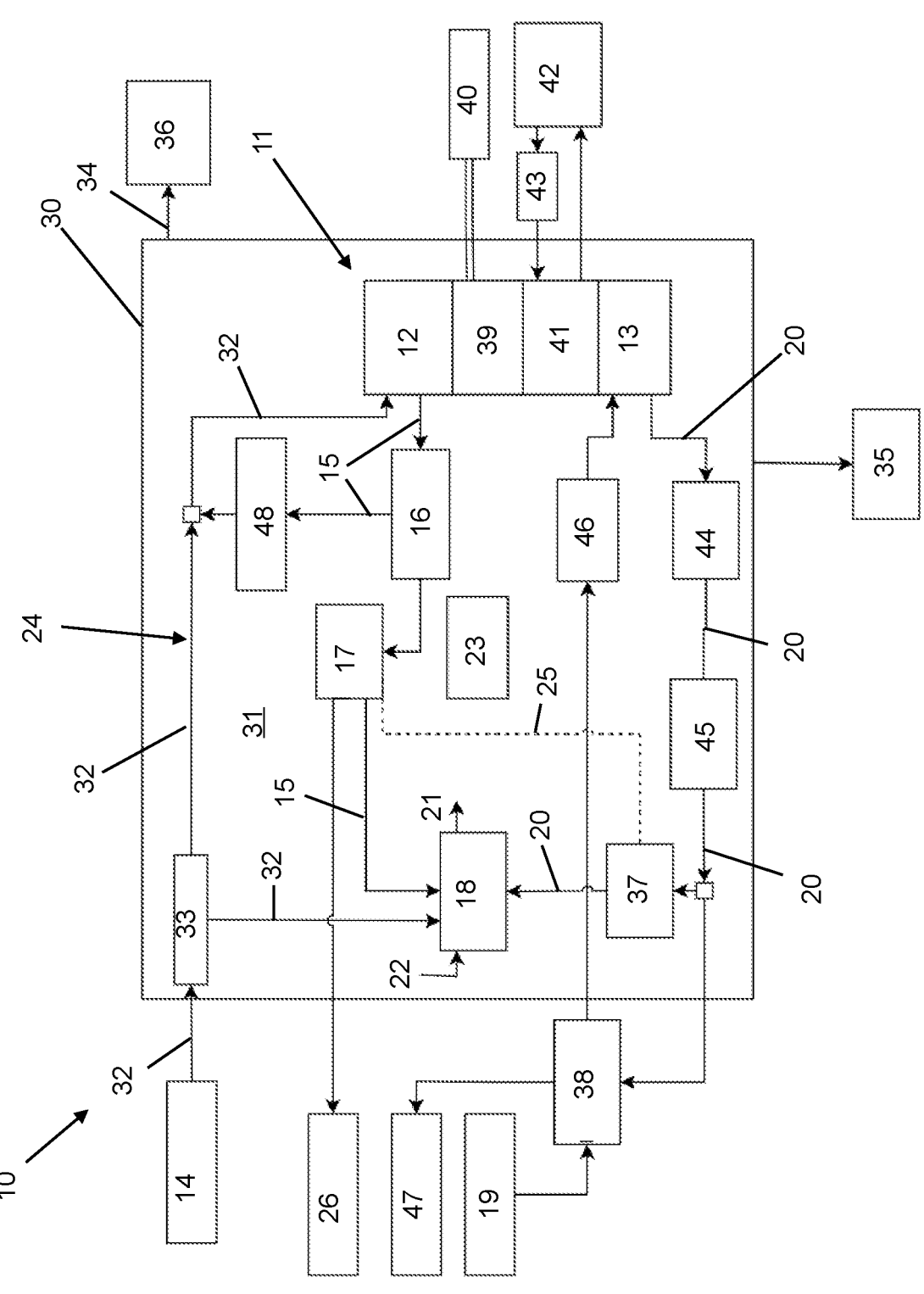
FIG. 1 shows a schematic block diagram showing the fuel cell system and a method for generating inert gas according to a first preferred embodiment of the invention.

FIG. 1 shows a fuel cell system 10 according to a preferred embodiment of the invention. The fuel system 10 comprises a fuel cell unit configured as a fuel cell stack 11 provided in a housing 30 and comprising at least an anode part 12 and a cathode part 13. The anode part 12 receives hydrogen 32 ($H_2$) from an $H_2$ supply unit 14 via a hydrogen supply line 24, and supplies a purge gas 15 via a water separator 16 and a purge valve 17 to a catalytic converter 18.

The cathode part 13 receives air from an air supply unit 19 and releases a stream of cathode exhaust gas 20 which is supplied to the catalytic converter 18. The catalytic converter 18 converts oxygen in the cathode exhaust gas 20 and hydrogen in the purge gas 15 to generate an inert gas mixture 21 which is supplied to the interior 31 of the housing 30.

Alternatively, or in addition to the purge gas 15 supplied to catalytic converter 18, fresh hydrogen 32 is supplied from the hydrogen supply unit 14 via an $H_2$ valve 33 to catalytic converter 18, which uses in that case the fresh hydrogen 32 to generate the inert gas mixture 21.

In addition, the catalytic converter 18 may also be configured for using a gas 22 which is in the interior 31 of housing 30 to generate the inert gas mixture 21. That gas 22 results from leaks of the components of the fuel cell system which are enclosed in housing 30.

Further, the system 10 comprises $H_2$ and $O_2$ sensors provided in an H2-/O2-sensor unit 23 for determining the concentration of $H_2$ and $O_2$ in the interior 31 of housing 30.

The fuel cell stack 11 further comprises an electric part 39 connected to a load 40, a cooling part 41 connected to a heat exchanger 42 via a pump 43. Downstream the cathode part 13 of fuel cell stack 11, a shut off valve 44 and a water separator 45 are provided to control the flow of the cathode exhaust gas 20 and to separate water therefrom, before it is further supplied via air control valve 37 to catalytic converter 18, and to a humidification unit 38.

Air supplied from air supply unit 19 to the cathode part 13 of fuel cell stack 11 is humidified by the humidification unit 38. The air flow is controlled by the air supply unit 19. Shut-off valves 44, 46 before the stack 11 and after the stack 11 provide the function to shut off oxygen supply to the stack 11. This provides the benefit that in a shut-down of the fuel cell system, oxygen depleted conditions can be maintained inside the fuel cell stack, which is beneficial for its lifetime.

The cathode exhaust gas 20 is released by an air supply OUT element 47 after passing the humidification unit 38.

Purge gas 15 released from the anode part 12 of fuel cell stack 11 is resupplied by a recirculation device 48 to the anode part 12 after passing the water separator 16.

In the following, an example for inert gas generation will be described in detail:

The cathode exhaust gas 20 from the stack 11 has an oxygen concentration of e.g. approximately 10-15%, depending on the operation point and the system 10. This gas is mixed in an ODA (oxygen depleted air) generator provided by catalytic converter 18 with the hydrogen purge gas 15, which consists of hydrogen, nitrogen and water vapour.

Depending on system operation conditions and fuel cell technology, the dry volumetric hydrogen concentration may be in the range of 80-95% and the rest is nitrogen coming from the crossover from the cathode 13 side. The relative humidity of this gas may be typically in the range of 40-80%.

This hydrogen rich gas is mixed with the oxygen depleted air from the cathode exhaust gas 20 and oxidized to the inert gas 21 containing less than 4% oxygen, inhibiting the reaction of hydrogen and oxygen. The generated ODA is then released into the housing 30 around the fuel cell system 10, thus inerting its ambient environment.

A housing chimney 36 makes sure that excess gas 34 can leave the system 10. The housing 30 may also comprise a draining system 35 for condensing water. An $H_2$-chimney 26 is provided to release hydrogen containing gas from the purge valve 17 to the exterior of the system 10.

The hydrogen flow to the catalytic converter 18 can be controlled with the purge valve 17 and/or $H_2$ valves 33.

The air control valve 37 is provided to control the adequate mixture to reach the goal of an oxygen concentration below a limit of 4%. The air control valve 37 can be directly connected to the purge valve 17. Both valves are connected either electronically or mechanically by a connection element 25 to open at the same time, to ensure no air containing oxygen can enter the ODA generator and further downstream the fuel cell housing 30 in case of a failure mode where no hydrogen containing gas is supplied to the ODA generator as this would lead to the absence of the reaction and an oxygen rich environment in the fuel cell housing.

It is also possible and for some cases advantageous to use fresh hydrogen 32 from the hydrogen supply line 24 which supplies hydrogen to the fuel cell stack 11. Either only the fresh hydrogen 32 or the fresh hydrogen 32 in a mixture with the purge gas 15 can be used for the catalytic reaction in catalytic converter 18.

Further, the inert gas 21 can be generated by using gas 22 in the fuel cell housing 30 resulting from leaks within the system 10 can be used for the catalytic reaction.

Once an inert gas environment is present in the interior 31 of housing 30, the catalytic converter 18 can be used to continuously oxidize the hydrogen and the air both coming from stack 11 and system leaks to maintain an inert environment with a hydrogen concentration which may e.g. be below 1% and an oxygen concentration which may e.g. be below 4%, however these values may vary depending on different parameters (e.g. temperature).

If needed to maintain these concentration levels, additional air from the cathode exhaust gas 20 or hydrogen 32 from the $H_2$ supply unit 14 and the $H_2$ supply line 24 can be used. The fuel cell housing 30 may contain the hydrogen and oxygen concentration sensors 23 to verify the ODA generation. Hydrogen and oxygen sensors can also be placed in the supply and exhaust lines of the catalytic converter to ensure proper functioning.

Figure 2:
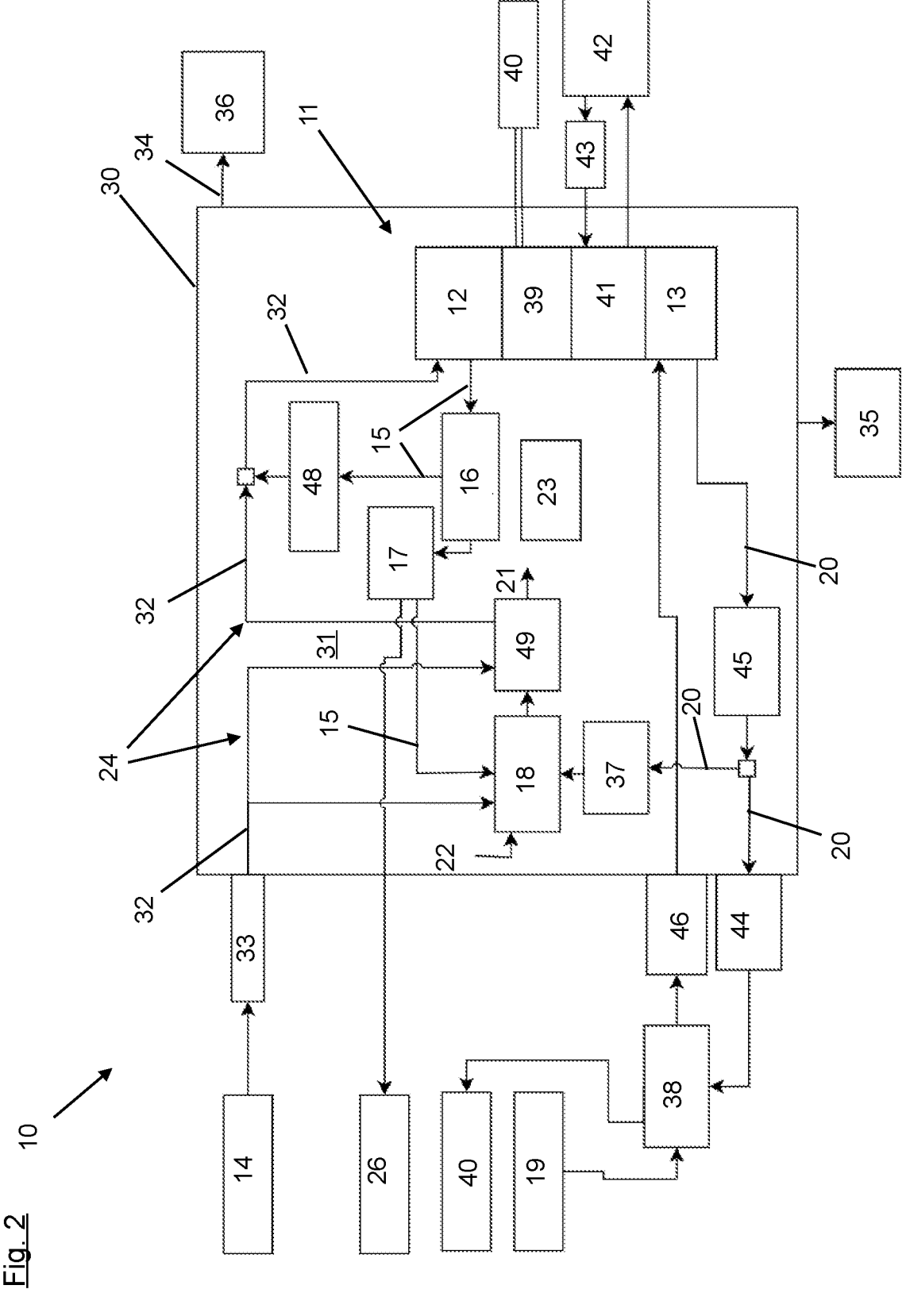
FIG. 2 shows a schematic block diagram showing the fuel cell system and a method for generating inert gas according to a second preferred embodiment of the invention.

FIG. 2 shows a second preferred embodiment, in which the reaction heat from the catalytic reaction in catalytic converter 18 is used to pre-heat the hydrogen 32 coming from the hydrogen supply line 24 before entering the fuel cell stack 11.

A heat exchanger 49 is provided downstream the catalytic converter 18 to cool down the generated inert gas 21 before it is released into the interior 31 of the housing 30. The heat exchanger 49 is arranged in the hydrogen supply line 24 to pre-heat the hydrogen supplied to the anode part 12 of the fuel cell stack 11.

In both embodiments, the hydrogen valves 33 and the shut-off valves 44 and 46 may be arranged outside the fuel cell housing 30, as shown in FIG. 2, to prevent additional hydrogen and air from entering the fuel cell housing 30 in case of a failure mode.

The catalytic converter 18 may be placed inside the fuel cell housing 30, as shown in FIGS. 1 and 2, or outside housing 30, depending on the underlying safety strategy.

For further details of the second embodiment, reference is made to the description above relating to the first embodiment and FIG. 1.

Figure 3:
FIG. 3 shows a schematic block diagram showing the fuel cell system and a method for generating inert gas according to a third preferred embodiment of the invention.

FIG. 3 shows a third preferred embodiment of the invention. Also here, the elements and their functions shown in the figure are similar to those shown in FIG. 1, and reference is made to the description above.

However, in the third embodiment, the catalytic converter 18 is part of a closed system 50 for recycling the gas 22 contained in the housing 30. The closed system 50 is arranged outside the housing 30 and comprises hydrogen and oxygen sensors 51 to determine the concentration of hydrogen and oxygen supplied from the interior 31 of the housing 30 to the catalytic converter 18.

As this is a closed loop system, the system has a tendency to accumulate more $O_2$ or $H_2$. Hence, as per the diagram, cathode or $H_2$ can be injected into the catalytic burner to meet the concentration targets.

A fan 52 is provided in closed system 50 for recirculating the gas 22 received from the interior 31 of the housing 30 back to the interior of the housing after the catalytic conversion by catalytic converter 18. Downstream the catalytic converter 18, a water separator 53 and further hydrogen and oxygen sensor 54 are provided within closed system 50, to separate water from the generated inert gas and to determine its hydrogen and oxygen concentration before it is supplied to the interior 31 of the housing 30.

Figure 4:
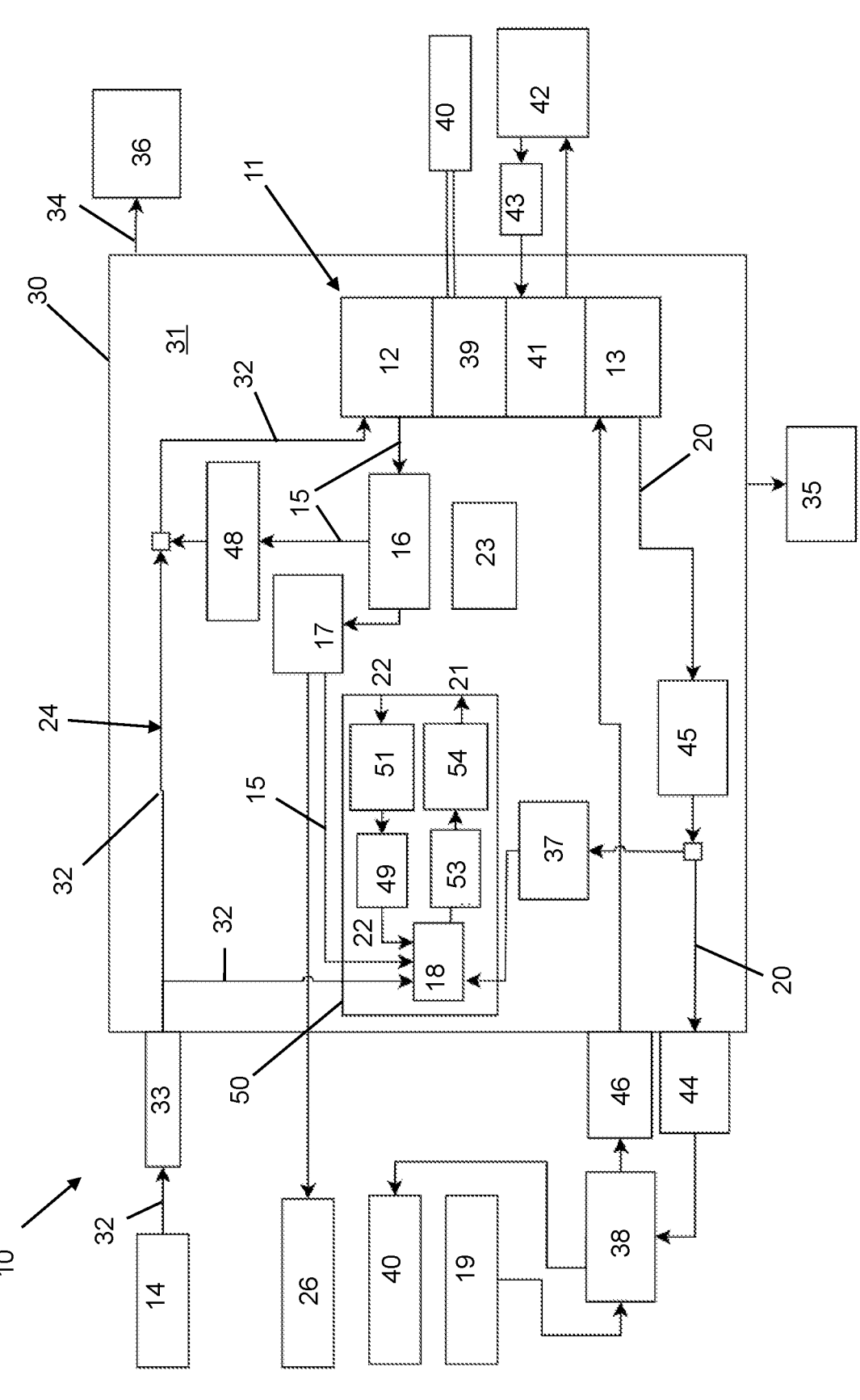
FIG. 4 shows a schematic block diagram showing the fuel cell system and a method for generating inert gas according to a fourth preferred embodiment of the invention.

FIG. 4 shows a fourth preferred embodiment of the invention. Also here, the elements and their functions shown in this figure are similar to those shown in the FIGS. 1 to 3, and reference is made to the related description above.

However, in the fourth embodiment, the closed system 50, which comprises the hydrogen and oxygen sensors 51, fan 52, catalytic converter 18, water separator 53 and further hydrogen and oxygen sensors 54, is arranged inside the housing 30 which encloses the fuel cell stack 11.

Also in the third and fourth embodiment shown in FIGS. 3 and 4, the hydrogen valves 33 and the shut-off valves 44 and 46 can be arranged outside the fuel cell housing 30, as shown in FIG. 2, to prevent additional hydrogen and air from entering the fuel cell housing 30 in case of a failure mode.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS 10 fuel cell system
11 fuel cell unit/stack
12 anode part
13 cathode part
14 $H_2$ supply unit
15 purge gas
16 water separator
17 purge valve
18 catalytic converter
19 air supply unit
20 cathode exhaust gas
21 inert gas mixture
22 gas the interior of the housing 30
23 $H_2$-/$O_2$-sensor unit/hydrogen and oxygen sensors
24 hydrogen supply line
25 connection elements
26 $H_2$-chimney
30 housing
31 interior of the housing
32 hydrogen
33 $H_2$ valve
34 excess gas
35 draining system
36 housing chimney
37 air control valve
38 humidification unit
39 electric part
40 load
41 cooling part
42 heat exchanger 43 pump 43.
44 shut off valve
45 water separator
46 shut-off valve
47 air supply OUT
48 recirculation device
49 heat exchanger
50 closed system
51, 54 $H_2$-/$O_2$-sensor unit/hydrogen and oxygen sensors
52 fan
53 water separator

The invention claimed is:

1. A fuel cell system, comprising:
a fuel cell unit provided in a housing and comprising an anode part and a cathode part,
a hydrogen source for supplying hydrogen to the fuel cell unit,
an air supply unit for supplying air to the fuel cell unit,
a catalytic converter for catalytically converting oxygen and hydrogen to generate an inert gas mixture and supplying the inert gas mixture to an interior of the housing,
wherein the catalytic converter comprises a cathode exhaust gas intake for receiving a cathode exhaust gas from the cathode part of the fuel cell unit,
wherein the catalytic converter is configured to generate the inert gas mixture from a purge gas supplied from the anode part of the fuel cell unit, or from fresh hydrogen supplied from a hydrogen supply unit of the fuel cell unit, or a mixture of the purge gas and fresh hydrogen,
wherein the catalytic converter comprises a gas intake for receiving ambient gas from the interior of the housing and to convert the ambient gas to an oxygen depleted gas containing no hydrogen or a reduced hydrogen concentration.

2. The fuel cell system according to claim 1, wherein the catalytic converter is configured to use gas resulting from leaks of air and hydrogen from components of the fuel cell system and provided in the interior of the housing to generate the inert gas mixture,
wherein the components of the fuel cell system are enclosed in the housing.

3. The fuel cell system according to claim 1, wherein the catalytic converter comprises a gas intake for receiving ambient gas from the interior of the housing to convert the ambient gas to an oxygen depleted gas containing a reduced hydrogen concentration.

4. The fuel cell system according to claim 1, further comprising:
a heat exchanger configured for heating the hydrogen before the hydrogen is supplied to the fuel cell unit, and configured for cooling the inert gas mixture generated in the catalytic converter before the inert gas mixture is supplied to the interior of the housing.

5. The fuel cell system according to claim 1, further comprising:
a cooling unit for providing a separate coolant stream to cool the inert gas mixture generated in the catalytic converter before the inert gas mixture is supplied to the interior of the housing.

6. The fuel cell system according to claim 1, further comprising:
a cathode exhaust gas control valve for controlling a flow of the cathode exhaust gas supplied to the catalytic converter.

7. The fuel cell system according to claim 6, further comprising:

a purge valve which is electronically, or mechanically, or electronically and mechanically connected to the cathode exhaust gas control valve to control the flow of the cathode exhaust gas to the catalytic converter depending on a flow of the purge gas.

8. The fuel cell system according to claim 1, wherein the catalytic converter is part of a closed system for recycling gas contained in the housing, the closed system comprising:

a hydrogen sensor and an oxygen sensor to determine the concentration of hydrogen and oxygen, respectively, supplied to the catalytic converter, and a fan for recirculating the gas received from the interior of the housing back to the interior of the housing after the catalytic conversion.

9. A method for generating inert gas for a fuel cell system, the method comprising:

supplying a cathode exhaust gas from a fuel cell unit provided inside a housing to a catalytic converter;

supplying a purge gas from an anode part of the fuel cell unit, or hydrogen from a hydrogen supply unit of the fuel cell system, or a mixture of both, to the catalytic converter;

catalytically converting oxygen in the cathode exhaust gas and the supplied purge gas, or hydrogen, or both, to generate an inert gas mixture; and supplying the generated inert gas mixture to the interior of the housing of the fuel cell unit.

10. The method according to claim 9, wherein a gas resulting from leaks of air and hydrogen from components of the fuel cell system and provided in the interior of the housing is used to generate the inert gas mixture, wherein the components of the fuel cell system are enclosed in the housing.

11. The method according to claim 9, further comprising: supplying a gas from the interior of the housing to the catalytic converter.

12. The method according to claim 9, further comprising: heating the hydrogen before the hydrogen is supplied to the catalytic converter, and cooling the inert gas mixture generated in the catalytic converter before the inert gas mixture is supplied to the interior of the housing.

13. The method according to claim 9, further comprising: providing a separate coolant stream to cool the inert gas mixture generated in the catalytic converter before the inert gas mixture is supplied to the interior of the housing.

14. The method according to claim 9, wherein supplying the cathode exhaust gas to the catalytic converter is controlled depending on a supply of the purge gas to the catalytic converter.

15. The method according to claim 9, wherein the gas in the housing of the fuel cell unit is recycled within in a closed system separated from the fuel cell unit, and, wherein the gas from the interior of the housing is recirculated back to the interior of the housing after catalytic conversion, or wherein a concentration of hydrogen and oxygen in the gas is determined before and after the catalytic conversion, or wherein an exhaust concentration of the gas recycled is controlled within a concentration target by feeding or adding oxygen or hydrogen to the catalytic reactor, or any combination of the foregoing.

* * * * *